United States Patent

Wolf

[15] 3,691,870
[45] Aug. 19, 1972

[54] BALANCING DEVICE

[72] Inventor: Richard Wolf, 15446 Sherman Way, Van Nuys, Calif. 91406

[22] Filed: Dec. 1, 1970

[21] Appl. No.: 93,998

[52] U.S. Cl. .............................. 74/573, 204/DIG. 6
[51] Int. Cl. ............................................. F16f 15/22
[58] Field of Search ..... 74/573, 5; 136/166; 204/194, 204/DIG. 6; 73/468

[56] References Cited

UNITED STATES PATENTS

| 3,390,017 | 6/1968 | Hennigan | 136/166 |
| 3,149,502 | 9/1964 | Caruso et al. | 74/573 |
| 3,301,090 | 1/1967 | Sanford | 74/573 |

FOREIGN PATENTS OR APPLICATIONS

| 937,445 | 9/1963 | Great Britain | 204/DIG. 6 |

*Primary Examiner*—William F. O'Dea
*Assistant Examiner*—Wesley S. Ratliff, Jr.
*Attorney*—Pendleton, Neuman, Williams & Anderson

[57] ABSTRACT

An electrical balancing apparatus for making minute adjustments in the center of gravity is disclosed. The apparatus includes a flexible container having electrodes mounted coaxially and connected to a unidirectional current source. The container is filled with an electrolyte so that an applied current causes electrodeposition from one electrode to the other depending on the direction of current flow. The container is constructed of a resilient material in a generally cylindrical shape but including a punched baffle portion adapted to accommodate the expansion and contraction of the electrolyte caused by temperature variations, as well as to prevent the creation of a void in the electrolyte or cracking of the cylinder.

In an alternative embodiment four electrodes are mounted in a generally oval resilient container which is deformable to a spherical configuration to accommodate expansion and contraction of the liquid electrolyte.

4 Claims, 7 Drawing Figures

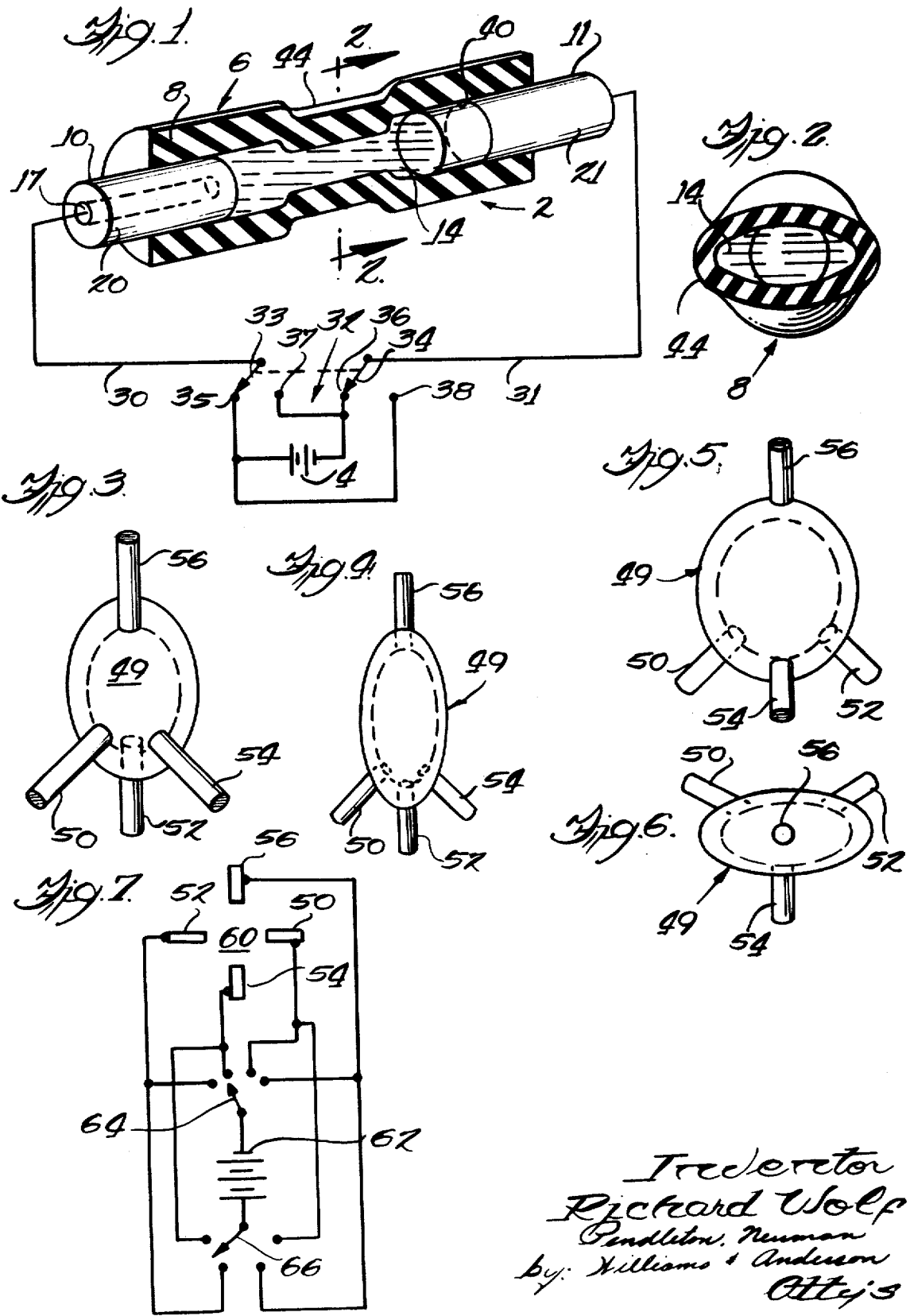

3,691,870

BALANCING DEVICE

BACKGROUND OF THE INVENTION

This invention relates to balancing apparatus and, more particularly, to an electrically controlled balancing apparatus especially useful for shifting the center of gravity of an object being balanced.

Balancing the weight of a body or shifting its center of gravity is a problem encountered in the construction and operation of gyroscopes, motor rotors and the like. One balancing technique has been to remove material from the body by drilling away material at different points until acceptable balance is achieved. This process is only approximate and, moreover, is ordinarily irreversible. In other instances, as with precision indicating instruments, small mechanical sliders or weights such as screws have been used to make balancing adjustments. Again, this is an empirical process and is difficult to carry out when the instrument is in use.

Attempts have also been made to provide electrical weight balancing devices as shown in U.S. Pat. Nos. 3,301,090; 3,294,586; 3,135,674; 2,945,398; Re. 25,800; and Re. 25,752. A typical balancing unit includes a rigid container supporting a plurality of electrodes, the container being filled with a liquid electrolyte. In one such system, the container is a hollow rigid cylinder capped with metallic electrodes at each end and filled with electrolytic fluid. To rebalance, or change the center of gravity with this device, metal from one electrode is plated onto the other with the use of an external electrical circuit.

A problem sometimes experienced with such devices is that when the balancing unit is temperature cycled (a standard procedure to "settle" the components) or otherwise subjected to temperature changes, the electrolyte may expand due to temperature increases and may crack the containing walls, or otherwise cause leaks. When the temperature is reduced and the electrolyte contracts, voids may form within the container, rendering the balancing device unstable.

Further, the prior art balancing units have been limited to adjusting weight distribution in a single plane. Thus, several units are required to correct the balance of an object in all dimensions.

SUMMARY OF THE INVENTION

It is an object of the present invention to alleviate or overcome the problems outlined above.

A further object of the invention is to provide an electrical balancing unit whose performance and accuracy are not affected by environmental temperature variations.

Another object of the invention is to provide an integrated balancing unit capable of balancing a body in three dimensions.

Further objects and advantages of the invention will appear from the description of the invention, the drawings and the appended claims.

The electrolytic balancing unit of this invention includes a closed container which houses the electrolyte and a plurality of metal electrodes. The container walls are formed of a resilient material, preferably a plastic, but any resilient material which will contain the liquid may be used; resilient rubber, nylon, or metal are other examples. The shape of the container permits deformation under changing environmental conditions. Where two electrodes are used in the balancing device, the container is tubular, and preferably, but not necessarily, cylindrical, with a pinched, or non-cylindrical, portion. Where four electrodes are employed, the container is generally non-spherical, i.e., an ellipsoid. With these configurations the walls are not subject to cracking as the electrolyte expands, nor are voids liable to form when the electrolyte contracts.

DESCRIPTION OF THE FIGURES

FIG. 1 is an enlarged view of a balancing unit showing it partially broken away;

FIG. 2 is a cross-sectional view taken through the baffle portion of the balancing unit of FIG. 1;

FIG. 3 is a perspective view of another embodiment of the balancing unit of this invention;

FIG. 4 is a side view of the balancing unit of FIG. 3;

FIG. 5 is a front view of the balancing unit of FIG. 3;

FIG. 6 is a top view of the balancing unit of FIG. 3; and

FIG. 7 is a schematic diagram of the electrical connections of the balancing unit of FIG. 3.

Referring now to FIG. 1, an electrolytic balancing device 2 is shown connected to a unidirectional current source 4. The electrolytic balancing device comprises a cell 6 having a tubular member 8 formed of any suitable resilient plastic material, the plastic marketed under the trademark TYGON being an example. The ends of this tubular member are plugged by metallic electrodes 10 and 11 which are adhesively sealed to the tube. Thus, the electrodes and the tubular member form a liquid-tight container for an electrolyte 14 which fills the gap between the electrodes. In an illustrative embodiment, the electrodes are of high-purity copper, and the electrolyte is an aqueous solution of copper sulfate and sulfuric acid. Projecting portions 20 and 21 of electrodes 10 and 11 provide convenient terminals to which electrical connections to the DC supply 4 may be made.

By passing a unidirectional plating current between the electrodes 10 and 11 through the electrolyte 14, electrodeposition of electrode material occurs at either end of the tube, depending upon the direction of current flow. The electrodes are connected to a DC current source 4 through leads 30 and 31 and a double-pole, double-throw switch 32. The current can be made to flow through the balancing unit in either direction depending upon the setting of switch 32. For example, by connecting the terminal ends 33 and 34 of leads 30 and 31 to switch terminals 35 and 36, current flows from electrode 10 through the electrolyte 14 to electrode 11. Copper is thereby removed from electrode 10 and deposited adjacent electrode 11, shifting the center of gravity of the unit shown axially to the right. An exemplary layer of such deposited or plated metal is indicated by the section 40 shown adjacent the end of electrode 11. Should the direction of current flow be reversed by connecting terminal ends 33 and 34 to terminals 37 and 38, metal is removed from the electrode 11 and deposited on the electrode 10 adjacent the left-hand end of the tube. In either case, the amount of metal transferred or deposited depends upon the length of time the current flows.

As shown in FIGS. 1 and 2, the tubular member 8 includes a pinched section 44, preferably near the middle of the tube 8, having a reduced volume per unit of surface area as compared to the remainder of the tubular member. The pinched portion 44 provides a bellows effect to allow for expansion and contraction of the electrolyte fluid initially during temperature cycling of the balancing unit to stabilize its components as well as to accommodate other changes in environmental temperature which may be encountered. The material of the tubular member 8 has a different coefficient of expansion than the electrolyte solution. Thus, where the coefficient of expansion of the container is lower than that of the electrolyte, the walls of the tubular member 8 will be subjected to increasing pressure as the environmental temperature rises and the solution 14 expands in volume. Those portions of the walls of the member 8 which have a circular cross section cannot readily adjust to provide the added volume required, because the circular cross-section cylinder already provides the maximum volume per unit of surface area. However, the bellows portion 44 responds to this pressure by expanding from an oval cross section (shown in FIG. 2) towards a more circular cross section, thereby providing a higher volume per unit of surface area. Thus, the unit may be temperature cycled without undue pressure developing along the cylindrical walls or at the cemented joints.

In an exemplary method of fabricating the electrolytic balancing unit shown in FIG. 1, the copper cylinders which serve as electrodes 10 and 11 are inserted in the open ends of the tubular member 8 and sealed in place using an epoxy cement or other cement which is heat and acid-resistant. A hole 17 has already been drilled along the axes of one of the cylinders 10. A hypodermic needle is inserted through the hole 17, and the tubular member 8 is filled with the electrolytic solution. The needle is then withdrawn. The bellows section 44 of the tubular member 8 is formed by squeezing the tube 8, with pliers, for example. The excess electrolyte caused by this reduction in volume is forced out the open hole 17 which is then crimped shut. The portions of the exposed copper cylinders which serve as electrodes may then be attached to the DC source to carry out the electroplating function.

The fabricating operation described above preferably takes place at an environmental temperature near the lowest environmental temperature to be encountered by the balancing unit to forestall potential void formation due to further shrinkage of the volume of the liquid electrolyte. During temperature cycling, the internal volume defined by the bellows portion of the balancing unit will expand in response to the pressure of the expanding electrolyte. As the temperature is reduced, the resilient wall surface of the bellows portion of the unit resumes its original shape.

FIGS. 3 through 6 show a balancing unit capable of making weight distribution adjustments in three dimensions. In general, of course, the basic concepts of the invention are applicable to one, two or three dimensions. A two-dimension balancing device, for example, might contain three electrodes mounted in a single plane. In the vertical plane, the baffle-like container 49 of the balancing unit has a non-circular, preferably oval configuration; in the horizontal plane, it is preferably circular. Three conducting elements 50, 52 and 54, similar to those described above with respect to FIGS. 1 and 2, are angularly disposed near the bottom of the unit, their inboard ends which serve as the balancing unit's electrodes being preferably located in the same plane and angularly equidistant. A fourth conducting element 56 is located at the top of the unit, with its inboard end preferably centered over the triangle formed by the three coplanar ends of the conducting elements 50, 52 and 54. The unit is filled with electrolyte in an environment preferably maintained at the lowest point of the temperature cycle to be encountered by the unit. As the unit's environmental temperature increases, the electrolyte volume also increases, and the container changes from its initial, non-spherical shape to a more spherical shape. As in the previous embodiment, the container 49 of the balancing unit is constructed of a resilient material so that it is capable of easily changing its shape to the more nearly spherical configuration. This bellows effect provides the increase in volume per unit of the surface area necessary to accommodate the liquid electrolyte for a four-electrode balancing unit.

As in the first embodiment, the wall material of which the container for the balancing unit is constructed has a relatively lower coefficient of expansion than the electrolyte within. As a result, the degree of change in the balancing unit's shape, to accommodate an increased fluid volume, is controlled by the amount of electrolyte expansion so that the electrolyte is continuously maintained under pressure. Thus no voids are able to form, and gas generation is suppressed within the electrolyte solution.

To balance a body 60 (FIG. 7), by electroplating from one element to another, a DC source 62 provides unidirectional current flow of either polarity through the solution between any two or more of the four electrodes. The axis along which plating is to occur and the direction of the plating (and the resulting shift in center of gravity) are determined by the setting of conventional four-position switches 64 and 66.

While two particular embodiments of this invention are shown above and described, it will be understood, of course, that the invention is not to be limited thereto, since many modifications may be made. It is contemplated, therefore, by the appended claims, to cover any such modifications as fall within the true spirit and scope of this invention.

What is claimed is:

1. An electrolytic balancing apparatus for altering the position of the center of mass of a body and capable of withstanding temperature cycling comprising:
   a container formed of resilient material having a first coefficient of thermal expansion;
   a plurality of electrodes having portions disposed within said container;
   a quantity of liquid electrolyte disposed within said container in intimate contact with said electrodes and having a second coefficient of thermal expansion other than said first coefficient of thermal expansion;
   a chamber having a volume defined by the interior surface of said container and portions of said electrodes, said volume being substantially completely occupied by said quantity of liquid electrolyte, and having a surface area which is substantially constant with variations in said chamber volume resultant from the difference between said first and second coefficients of thermal expansion; and circuit means coupled to said electrodes for passing an electric current through said electrolyte between at least two of said electrodes thereby effecting an electrolytic transfer of metal between said two electrodes altering the position of the center of mass of said body.

2. The apparatus of claim 1 wherein said container is of a generally circular cylindrical configuration having first and second electrodes disposed at first and second ends thereof and said container comprises a pinched baffle portion disposed approximately midway between said first and second electrodes.

3. The apparatus of claim 1 wherein said container has a generally oval cross-section and is capable of approaching a shape having a circular cross-section under conditions of maximum differential expansion between said electrolyte and said chamber.

4. The apparatus of claim 3 further comprising four electrodes disposed within said container in a non-coplanar arrangement.

* * * * *